Dec. 20, 1955 C. JONES 2,727,476
ROTATABLE DIBBLE-TYPE PLANTER
Filed Sept. 16, 1952 4 Sheets-Sheet 1
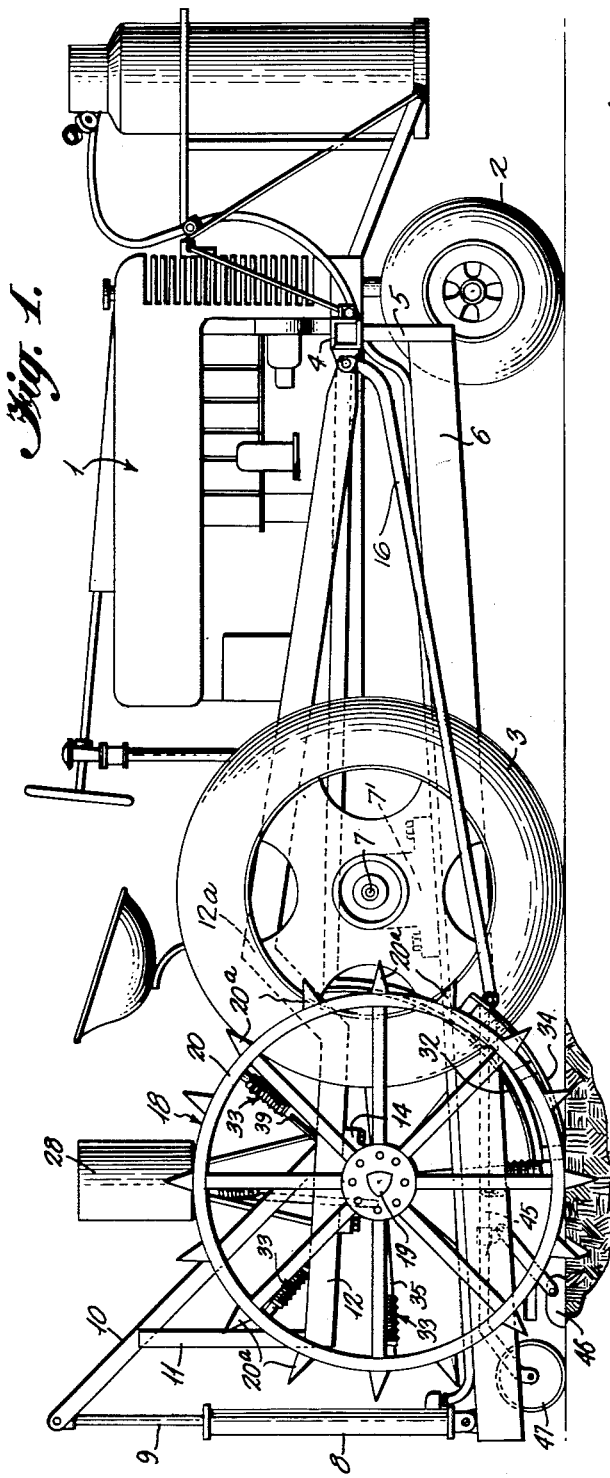
INVENTOR
Cleveland Jones
BY Mason, Fenwick & Lawrence
ATTORNEYS Dec. 20, 1955            C. JONES            2,727,476
ROTATABLE DIBBLE-TYPE PLANTER
Filed Sept. 16, 1952            4 Sheets—Sheet 2
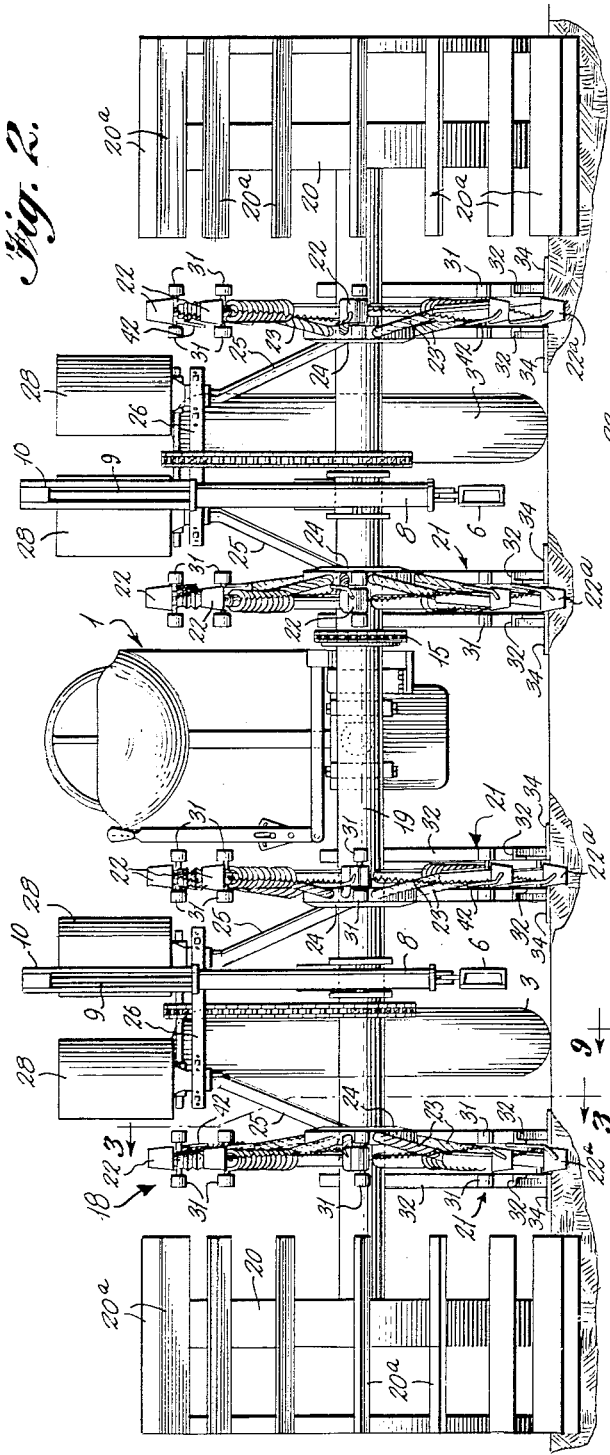
INVENTOR
*Cleveland Jones*
BY *Mason, Fenwick & Lawrence*
ATTORNEYS

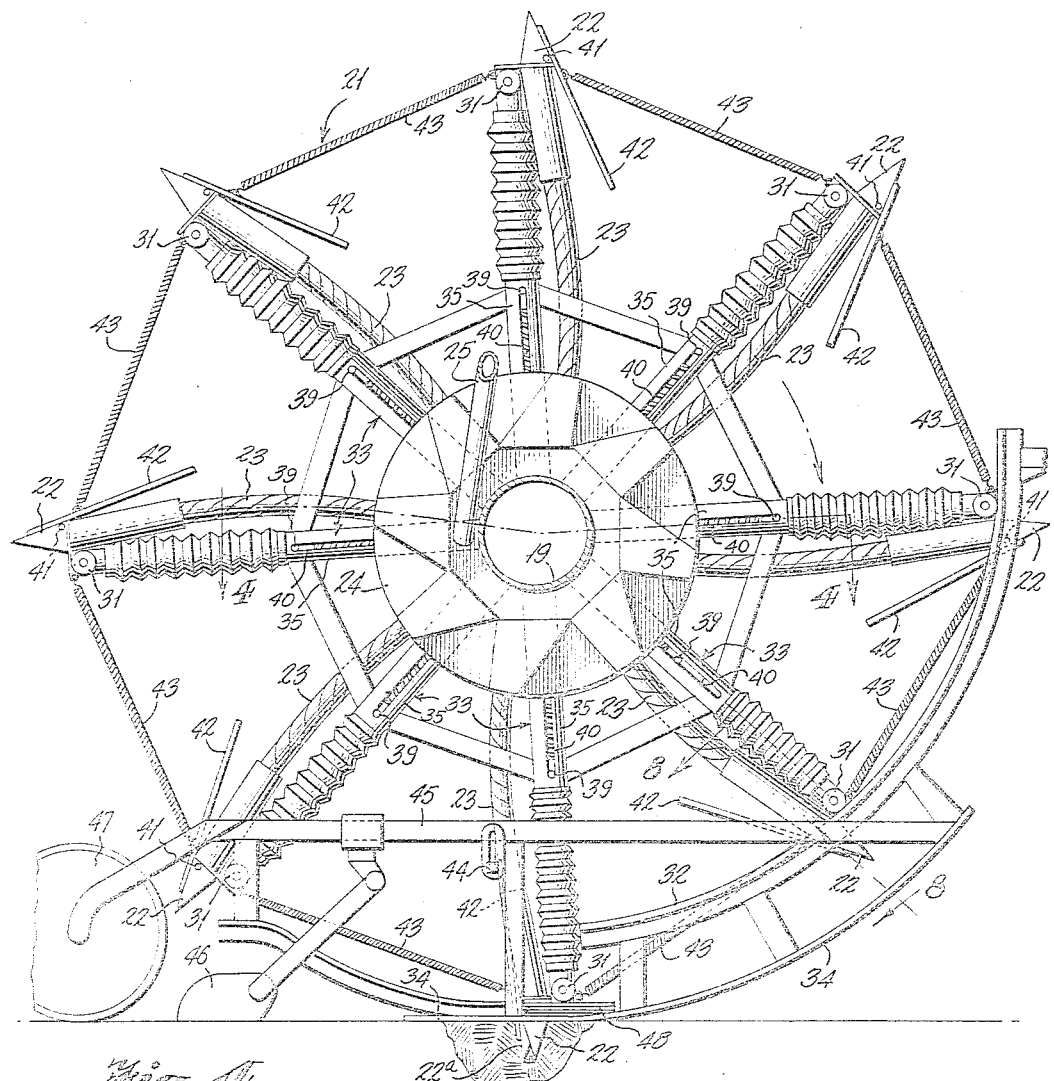

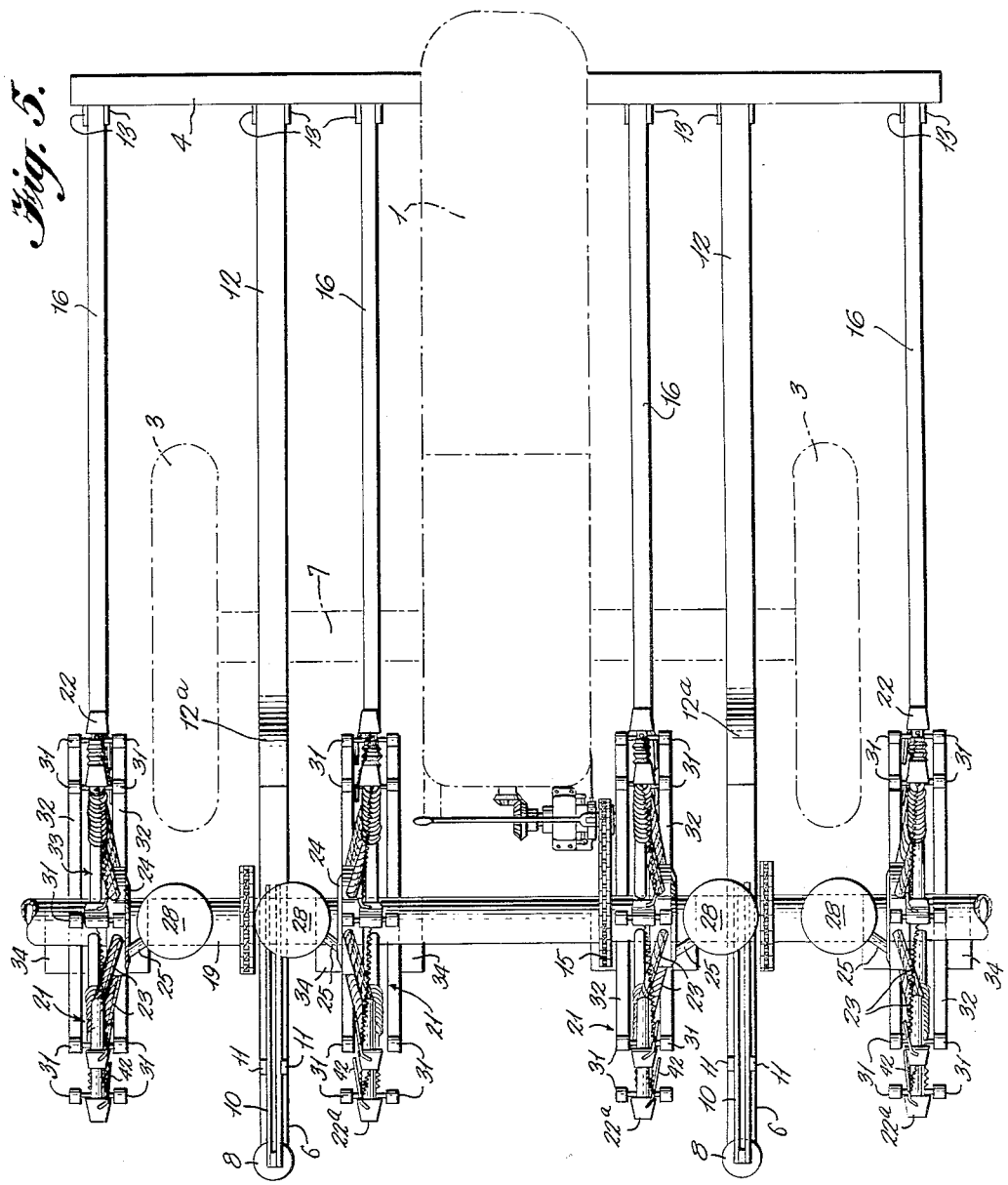

United States Patent Office 2,727,476
Patented Dec. 20, 1955

2,727,476
ROTATABLE DIBBLE-TYPE PLANTER
Cleveland Jones, Inverness, Miss.
Application September 16, 1952, Serial No. 309,869
4 Claims. (Cl. 111—91)

This invention relates to a cotton or agricultural planter adapted to deposit hills of seed along a plurality of rows at pre-determined depths, and uniformly spaced and aligned in both longitudinal and lateral directions so as to enable cross plowing of the crop transversely of the direction of travel of the planter.

An object of the present invention is to provide a cotton or agricultural planter which is capable of planting a plurality of rows of seed, such as four rows, at predetermined depths and spaced intervals in both longitudinal and transverse alignment, so as to enable plowing of the field crosswise of the rows of planted seeds.

A more specific object of the present invention is to provide a four row cotton or agricultural planter having a seed feeding mechanism which assures constant flow of a supply of seed, and which will positively plant hills of seed to a predetermined depth as well as deposit a predetermined amount of seed in each hill.

A still further object of the invention is to provide a planter having a plurality of seed planting wheels, each having spring operated seed boxes or planting tips spaced about its periphery which are positively plunged into the soil and opened to deposit hills of seed at varying depths at the proper time interval.

Other objects and advantages of the invention will become apparent from a study of the following description taken with the accompanying drawings.

In the drawings:

Figure 1 is a side elevational view of a tractor-drawn, four-row cotton or agricultural planter embodying the principles of my invention.

Figure 2 is a rear elevational view of the device shown in Figure 1.

Figure 3 is an enlarged elevational view partly in section and taken along line 3—3 of Figure 2 showing a planting wheel equipped with means for feeding and depositing seed.

Figure 4 is a fragmentary cross sectional view taken along line 4—4 of Figure 3 and more clearly showing the construction of the yieldable plungers and seed feeding flexible tubes.

Figure 5 is a partial top plan view of the structure shown in Figures 1 and 2 with the axle supporting ground wheels omitted and the tractor portion shown in dash and dot outline to more clearly illustrate the agricultural planter construction.

Figure 6 is a fragmentary view of a portion of the structure shown in Figure 3 for planting measured amounts of seed in the soil by a plunger operated seed box having a hinged gate and for tripping open the hinged gate of such box.

Figure 7 is a transverse cross sectional view taken along line 7—7 of Figure 6.

Figure 8 is an enlarged transverse cross sectional view showing the planting tip or seed box and associated mechanism including the cam track and guide rollers for guiding the box along an arcuate path prior to plunging it into the soil.

Figure 9 is a cross sectional view taken along lines 9—9 of Figure 8, and

Figure 10 is a perspective view of the seed box gate.

Referring more particularly to Figures 1 and 2 of the drawings, numeral 1 generally denotes a tractor of any well known construction, such as a diesel powered tractor, having front wheels 2 and rear wheels 3. The tractor chassis includes a front cross beam 4, which is clearly shown in Figure 5, which has a pair of integral downwardly extending extensions 5 whose lower ends are integrally secured to the front ends of stationary beams 6 preferably of hollow boxed construction which extend longitudinally of the tractor as will be apparent from Figure 1 and which extend underneath and rearwardly of the rear axle 7 of the chassis and are supported by the rear axle 7 by means of the bearing brackets 7'. At the extreme rear end of each stationary beam 6 is pivotally mounted a hydraulic cylinder 8 including a plunger 9 pivotally secured to an angularly disposed arm 10 which in turn is rigidly connected to an arm or brace 11 rigidly fastened to the rear end of longitudinally extending, pivotal beam 12 which may be of hollow rectangular cross section. The front ends of beams 12 are pivotally mounted to bearings such as 13 which are rigidly secured to the front cross beam 4 adjacent the sides of the tractor chassis. The intermediate portions 12a of the pivotal beams 12 are provided with a bend or crook so as to clear the top of the rear axle 7 of the tractor during up and down pivotal movement of beams 12. The rear end portion of each beam 12 carries an axle housing or bearing 14 for the seed planting reel 18.

Upon operation of the hydraulic cylinders 8 the pivotal beams 12 will be lifted upwardly about their pivots on the front cross beam 4 so as to carry with them the seed planting reel 18, which will be described in detail hereinafter, to enable selective engagement or disengagement of the planting reel with the ground surface.

An important feature of the invention resides in the construction of the seed planting reel 18 and the seed distributing and planting mechanism associated therewith. The seed planting reel 18 is built on an axle or pipe 19 which may be about 6 inches in diameter, 3/16 inch in thickness and 12 feet long—although it will be understood that such dimensions are merely by way of example. At each end of the pipe 19 there is rigidly secured, such as by welding, a plate onto which is rigidly bolted about the periphery of the plate, a wheel 20. A suitable diameter of the wheel 20 is about 50 inches. Around the outer perimeter of wheels 20 about 11 inches apart there are rigidly secured transversely extending knives or blades 20a which may be about 25 inches in length and 3 inches in width and of wedge shaped cross section with a sharp edge outermost so as to pierce into the ground to form grooves about 3 inches deep as the reels roll along. The blades 20a of wheels 20 are in lateral alignment. The purpose of the wheels 20 is to form lateral impressions or grooves in the ground on both sides of the tractor so that after one series of rows of seed have been planted as the result of travel of the tractor along a length of the field, then by turning around the tractor and gearing one of the wheels 20 to the grooves formed, there will be resulting lateral alignment of the hills of seed as the tractor moves in a reverse direction to plant additional rows of seed, thus making it possible to subsequently cross plow the ground between lateral rows of seed.

At about 36 inch intervals or other suitable intervals along the length of the axle or pipe 19 there are rigidly secured seed planting wheels 21 there being four such wheels shown as more clearly illustrated in Figures 2 and 5. The purpose of these wheels is to hill-drop seed along four rows parallel to the path of travel of the tractor about 22 inches apart and to plant hills of seed at equal distances apart, perpendicular to the ground surface and aligned straight across from row to row on 36 inch rows or wider so that the crop can be plowed crossways of said path of travel.

Since the four seed planting wheels 21 for planting the four longitudinally spaced rows of seed are of identical construction, a description of one of such wheels such as is more clearly illustrated in Figures 3 and 4, is deemed to suffice.

Each of the seed planting wheels 21 is provided along its periphery with a plurality of equally spaced, radially outwardly extending planting tips or seed boxes 22 of wedge shaped hollow construction. Eight of such planting tips are illustrated by way of example although a greater or smaller number may be used instead. An important feature of the invention resides in the transverse alignment of the planting tips 22 of the four seed planting wheels 21 with each other and with certain knives 20a on the outer wheels 20. That is to say that since alternate knives 20a of wheel 20 are in alignment with the adjacent planting tips 22 and the planting tips of all four wheels are in lateral alignment with each other, also since all four wheels 21 are rigidly mounted on the pipe axle 19, the various planting tips 22 mounted on the four wheels 21 are always in exact transverse alignment with each other and with the knives 20a of outer wheels 20. This enables cross plowing of a field between the transverse spaces intermediate the transverse rows of the hills of seed. Thus, on travel of the vehicle along the field four longitudinal rows of seed hills are planted, and when the vehicle is turned around, to plant four additional parallel rows in the reverse direction, the knives of wheels 20 will be lowered into exact correspondence or geared relationship with the lateral grooves already made by the same wheel 20 during the previous run of the tractor.

Another important feature is the specific mechanism and construction for feeding and planting hills of seeds. The various seed boxes or planting tips 22 are fed with seed which flows through a flexible tube or hose 23, the other end of which is connected to one of the outlet openings of an annular seed distributing compartment or partitioned jacket 24 having eight individual compartments or pockets distributed about and rigidly secured to the pipe axle 19. A stationary seed feed pipe 25 is clamped by means of a clamp 26 to an upper beam and is provided for the purpose of feeding seed from a stationary seed hopper 28 to the distributor compartment 24. As the seeds drop out of hopper 28 they flow through feed pipe 25 in a slightly forward direction and feed a steady stream of seed into the annular space between the pipe axle 19 and partition jacket 24, dropping seed into each partitioned pocket as the distributor 24 rotates with axle 19. The pockets in the jacket 24 will be successively filled with seed as they pass under the steady stream discharge from pipe 25. From the pockets in jacket 24 the seeds travel through the various flexible tubes or hoses 23 that lead to the seed boxes or planting tips 22.

As shown more clearly in Figures 8 and 9 the seed box or planting tip 22 has secured thereon a cross pin or bolt 29 fastened to the split lower end of the tubing of a spring actuated plunger 33 and having rotatively mounted at the ends thereof guide rollers 31 which are adapted to roll on a stationary cam track or split shoe 32 comprising two spaced angle irons extending along arcs subtending about ¼ of the circle of the planting wheels. Shoe 32 extends upwardly and forwardly of a slide 34 that slides on top of the row of earth, and is pivotally mounted by means of beams 16 to front cross beam 4.

The planting tips or seed boxes 22 are adapted to be plunged into the ground after rollers 31 move off of their guiding cam tracks 32 when vertically below axle 19 by means of spring actuated plungers 33, more clearly illustrated in Figure 4. Each plunger comprises a metal tube 35 welded to and extending radially outward from pipe axle 19 and having a coil spring 36 therein. The outer end of spring 36 is urged against the end of a plunger rod 38, which rod is telescopically fitted within tube 35, so as to normally bias rod 38 in a yieldable manner radially outwardly and thereby yieldingly urge guide rollers 31 against the cam track 32. A pin 39 extends through rod 38 and has one end slidable in a slot 40 in tube 35. Pin 39 striking the end of the slot will prevent the rod from being forced out of the tube.

Thus, as the wheel 21 rotates the guide rollers 31 will come into engagement with split shoe or cam track 32 about 36 inches from the ground or thereabouts and will move along an arcuate path. As the rollers roll down the shoe, they compress spring 36 within tube 35 about four inches or more depending on the height of the row of earth. As the rollers approach a point vertically below the axle pipe 19 they jump off the split shoe. Therefore, the planting tips or seed boxes are successively plunged into the ground about 3 inches by spring action, and a moment later the seeds are deposited as a trigger mechanism to be described hereinafter comes into operation. Reels 18 are rotated by movement of wheels 20 along the ground and traction lag is prevented by coupling the axle 19 to the tractor motor by chain and sprockets 15.

Each seed box or planting tip 22 is provided with a hinged gate or wall 22a on the rear side, hingedly mounted on a pin or rivet 41 that is adapted to pivotally open to deposit the seed at predetermined time intervals determined by a tripping mechanism. More specifically, there is rigidly secured to each gate 22a a trip rod 42 having connected thereto one end of a tension spring 43, the other end of the spring being connected to an adjoining plunger. As will be seen more clearly in Figure 3 trip rods 42, as they come into engagement with a stop or trip 44 which is stationarily mounted on support 45 which is fixed with respect to the split shoe, will cause pivotal opening movement of the gate against the tension of the spring 43 immediately after the seed box has been plunged into the ground surface. The seed depositing boxes are synchronized in speed with the ground since the entire reel 18 rolls on the ground. The boxes may be of any suitable dimension, for example three inches wide and of wedge shape.

In some instances it is desirable to provide the seed box with a recessed corner as shown in Figure 8 so as to provide two levels in the box for planting seed bunches side by side at slightly different levels. For example, one bunch of seed may be planted about ½ inch deep and the other bunch about 2 inches deep from the same feed box. It will be noted from Figures 8 and 9 that one corner of the seed box is notched so that portions of the seed box will penetrate the ground to two levels. When the opening gate is moved it will push back the dirt at the two different levels so that seed will drop on the two shelves which have been formed. The seed is held in the container prior to the opening of the gates by an inclined partition 45 which forms a bottom for the seed box. Of course, if a single depth of planting is desired, the recess may be omitted and the seed box made perfectly wedge shaped.

As the plungers jump off the shoe successively to plunge the seed boxes into the ground, they hit a stop 48 to gauge the depth of seed planting. After the box has been plunged into the ground by the plunger spring and its gate opened by the trip mechanism so as to deposit a hill of seed into the ground, a covering shovel 46 will pull the dirt over the hills and the rear press wheel 47 will press the dirt in somewhat the same manner as in an ordinary planter.

When the end of the row is reached the entire reel 18 including its planter wheels 21 is raised by virtue of raising of the pivotally mounted supporting beams 12 by hydraulic cylinders 8 and turned around. The reel is then lowered so that the knives on the end wheels 20 will exactly fit and be geared to the lateral gaps or grooves that were made previously thereby, as the previous four rows were planted. Thus, by rolling the wheels 20 in these same gaps made during a prior trip in the reverse direction the hills of seed will be aligned crosswise of the field so as to subsequently enable plowing of the field in a crosswise direction, that is between transverse rows of seed hills.

Thus, it will be seen that I have provided a four row cotton or agricultural planter (although there may be more or less than four rows if so desired) comprising a reel having end wheels with knives in transverse alignment with planting tips disposed on a plurality of inner seed planting wheels for planting longitudinal rows of seed and for retracking the same tracks formed by the outer wheels in a reverse direction, thereby planting successive groups of rows of seed or plant hills which are in transverse alignment across the entire field so as to enable cross plowing of the field; furthermore, I have provided a planter having a plurality of wheels, each having a plurality of circumferentially spaced planting tips or seed boxes, which are guided along an arcuate path by a split shoe and rollers and then plunged into the ground at the proper time at a predetermined depth by a spring operated plunger and immediately thereafter opened by a trip mechanism to deposit a hill or pile of seed; furthermore I have provided a two-level compartmented seed box which allows planting seed at slightly different levels in side by side hills from a single seed box; furthermore, I have provided an annular compartmented rotary jacket for receiving a steady flow of seed from a stationary seed feed pipe and for feeding seed through flexible hoses, running alongside spring actuated plungers, to the seed boxes.

While I have in the above description disclosed what I believe to be a practical embodiment of my invention, it will be understood that the details of construction and arrangement of parts as shown and described are by way of example only and do not limit the scope of the invention as covered by the following claims.

What I claim as my invention is:

1. A planter comprising a transverse rotatable support mounted for floating movement over the ground, a planting wheel mounted on said support for rotation therewith, a plurality of substantially radially disposed planting devices spaced around said wheel and mounted for movement thereon substantially radially with respect to said wheel, each of said devices being individually spring-pressed outwardly relative to said support and wheel, each device having a projection extending laterally from the plane of said wheel, and a floating cam track disposed adjacent said wheel in the path of movement of said projections and of a form to engage each of said projections during rotation of the wheel to move the associated device inwardly and build up the spring-pressure thereof, said track having a rear end terminating vertically below said support at a distance above the ground, whereby movement of each projection past said rear end of the track releases the associated device for plunging downwardly into the ground by the built-up spring-pressure, said track being mounted upon a ground-engaging slide which is operatively connected to move with said wheel and capable of free vertical movement relative to said wheel, whereby said track is mounted for floating movement and said rear end of the track will be maintained at a fixed distance above the surface of the ground.

2. In a planter as claimed in claim 1, a stop mounted on said slide below said rear end of the track and in the path of movement of the projection of the downward plunging device to control the depth of penetration of the device in the ground.

3. In a planter as claimed in claim 1, a second projection on each of said devices extending oppositely from said first-mentioned projection, and on the opposite side of said devices, said floating cam track being in two horizontally spaced parallel sections on opposite sides of said devices in the paths of movement of both said projections.

4. In a planter as claimed in claim 1, a seed distributor mounted co-axially of said support and having a number of outlets equal to the number of planting devices, and flexible tubes connecting the outlets of said seed distributor with said planting devices.

References Cited in the file of this patent

UNITED STATES PATENTS

| Number | Name | Date |
|---|---|---|
| 177,379 | Cronk | May 16, 1876 |
| 324,322 | Henderson | Aug. 11, 1885 |
| 431,288 | Shanks | July 1, 1890 |
| 501,449 | Shanks | July 11, 1893 |
| 512,646 | Deardorff | Jan. 9, 1894 |
| 550,188 | Matson | Nov. 19, 1895 |
| 2,171,031 | Graham et al. | Aug. 29, 1939 |
| 2,546,461 | Lewis | Mar. 27, 1951 |